(12) United States Patent
Pennock

(10) Patent No.: X4015
(45) Date of Patent: Feb. 8, 1825

(54) RAKE, HAY, REVOLVING

(76) Inventor: Moses Pennock

United States Patent

Patent No.: X4015

Moses Bennett, Patent – in the Revolving Way and Gravity Rake –
26th June 1822. – Nov. 23. 1824. – cancelled, Regrind Feb. 8. 1825. –
See Specification in vol. of Abstract Patents page 617. –
(N.G.)